United States Patent Office 3,223,660
Patented Dec. 14, 1965

3,223,660
STABILIZATION OF VINYL RESINS WITH TETRA-HYDROPYRANS AND ORGANIC METAL SALTS
Louis J. Pulver, Clifton, N.J., and Henry R. Thompson, West Forest Hills, N.Y., assignors to Nopco Chemical Company, Newark, N.J., a corporation of New Jersey
No Drawing. Filed May 27, 1960, Ser. No. 32,077
15 Claims. (Cl. 260—23)

This invention relates to the stabilization of vinyl halide resin compositions. More particularly this invention relates to the stabilization of vinyl halide resin compositions which are free of iron-bearing asbestos and which are generally used in the preparation of film and sheeting.

Halogen-containing vinyl resins are characterized by a very poor resistance to heat and light. As a result of exposure to heat and light these resins undergo degradation. This degradation or deterioration is manifested by discoloration and blooming as well as by a general weakening of the mechanical properties of the resin, i.e., the resin becomes brittle and loses strength. The extent of degradation is a function of the time of exposure to heat and light. For example, exposure to severe weather conditions and high processing temperatures in such operations as molding, milling and calendering has been found to induce resin degradation.

Accordingly, it is an object of the present invention to provide stabilizing compositions for stabilizing vinyl halide resins. Another object is to provide for heat and light stable vinyl halide resin compositions. It is another object to provide for the stabilization of these vinyl halide resin compositions during fabrication operations at which time elevated temperatures are employed. A further object is to stabilize these compositions during their use when they are exposed to varying weather conditions. Further objects will become apparent from the detailed description given hereinafter. It is intended, however, that the detailed description and specific examples do not limit the invention, but merely indicate preferred embodiments of the invention since various changes and modification within the scope of the invention will become apparent to those skilled in the art.

We have unexpectedly discovered that the above and other objects can be successfully realized by incorporating into the vinyl halide resin a stabilizing composition which contains in combination (1) one or a mixture of a particular class of tetrahydropyrans and (2) one or a mixture of metal organic salts. Thus, we have discovered that the combination of particular tetrahydropyrans with metal organic salts is an excellent stabilizer which prevents or effectively reduces the degradation of vinyl halide resins during its fabricaiton and use.

It is known to use one of our components, viz., the metal organic salts, as a stabilizer for vinyl halide resins. However, our combination of metal organic salts and tetrahydropyrans affords a stabilization which has been unexpectedly found to be greater than the stabilization achieved by use of metal soaps alone, or for that matter by the use of the tetrahydropyrans alone. Indeed, our combination is truly a synergistic combination since the stabilization achieved thereby is greater than the additive effect of the components. That is, the stabilization which is afforded to the resin by our combination is greater than that which is found by using an equal amount of only one of our components.

It is also known according to Canadian Patent No. 565,528, Lindenfelser, November 4, 1958, to incorporate particular tetrahydropyrans, viz., α-alkyl D-glucosides, into particular heat hardenable aminoplast resins. However, the problems of heat and light stabilization of vinyl halide resins differ greatly from the problems set forth in this disclosure regarding the aminoplast resins. Indeed, the present invention is an unobvious advance in the art relating to filled and unfilled vinyl halide resins which are free of iron-bearing asbestos.

Our tetrahydropyrans can be identified as follows:

A. 3,3,5,5 - tetrakis (hydroxymethyl) - tetrahydropyranol-4, also known as anhydroenneaheptitol which is abbreviated as AEH. It has the following structure

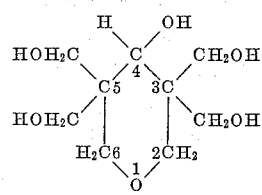

B. 2 - hydroxymethyl - 3,4,5 - trihydroxy - 6 - alkoxy tetrahydropyrans also known as α-alkyl D-glucosides in which the alkyl group contains from one to four carbon atoms. Examples of these α-alkyl D-glucosides are α-methyl D-glucoside; α-ethyl D-glucoside and α-butyl D-glucoside. α-methyl D-glucoside, also known as methyl α-D glucoside, has the following structure.

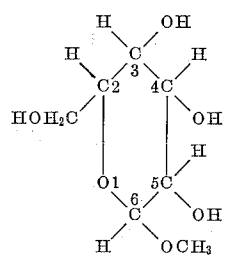

In addition to the tetrahydropyrans described under A and B above, we can also use other tetrahydropyrans, viz., their esters and ethers and mixtures of same so long as there are present at least two hydroxyl groups. The esters can be prepared in the conventional manner using an esterification catalyst such as hydrochloric acid by reacting the aforesaid tetrahydropyrans with most organic acids, particularly those aliphatic saturated and unsaturated acids having from 2 to 22 carbon atoms, e.g., acetic acid, propionic acid, caprylic acid, palmitic acid, oleic acid, linoleic acid, as well as their mixtures including commercial mixtures. The ethers can also be prepared in the conventional manner. Of especial interest are those esters which are prepared by reaction of the tetrahydropyrans described under A and B above with alkylene oxides, e.g., ethylene oxide, propylene oxide and butylene oxide in the presence of alkaline catalysts such as potassium hydroxide and sodium hydroxide. For example, from 1 to 15 mols of ethylene oxide can be introduced into these compounds. Note that when ethers are prepared from alkylene oxides, depending upon the particular alkylene oxide used, they will contain at the end of the chain, either a primary or secondary hydroxyl group. It should be understood that depending upon the esterification or etherification procedures employed as well as depending upon spacial and electronic considerations, the particular hydroxyl groups of our tetrahydropyrans which are esterified or etherified can vary. Usually in the esterification and etherification procedures, the primary hydroxyl groups are attacked first. Hence, in the following examples of esters and ethers of our tetrahydropyrans, we do not deem it necessary to specify which hydroxyl groups are esterified or etherified. It is only necessary that at least two hydroxyl groups be present. Exemplary of these esterified and etherified tetrahydropyrans are The monoacetate of anhydroenneaheptitol (AEH)
The monopropionate of AEH
The monocaprate of AEH
The monostearate of AEH
The monooleate of AEH
The diacetate of AEH
The distearate of AEH
The tri-octoate of AEH
The tri-stearate of AEH
The monomethyl ether of AEH
The monoethyl ether of AEH
The monobutyl ether of AEH
The monoadduct of 5 mols of ethylene oxide and AEH
The mono adduct of 8 mols of ethylene oxide and AEH
The mono adduct of 15 mols of ethylene oxide and AEH
The mono adduct of 5 mols of propylene oxide and AEH
The mono aduct of 15 mols of propylene oxide and AEH
The diadduct of 5 mols of ethylene oxide and AEH
The diadduct of 10 mols of ethylene oxide and AEH
The diadduct of 15 mols of ethylene oxide and AEH
The diadduct of 5 mols of propylene oxide and AEH
The diadduct of 8 mols of propylene oxide and AEH
The diadduct of 15 mols of propylene oxide and AEH
The triadduct of 5 moles of ethylene oxide and AEH
The triadduct of 10 mols of ethylene oxide and AEH
The triadduct of 5 mols of propylene oxide and AEH
The triadduct of 10 mols of propylene oxide and AEH
The mono adduct of 5 mols of ethylene oxide and α-methyl D-glucoside
The mono adduct of 8 mols of ethylene oxide and α-methyl D-glucoside
The mono adduct of 15 mols of ethylene oxide and α-methyl D-glucoside
The mono adduct of 5 mols propylene oxide and α-ethyl D-glucoside
The mono adduct of 15 mols of propylene oxide and α-methyl D-glucoside
The diadduct of 5 mols of ethylene oxide and α-methyl D-glucoside
The diadduct of 10 mols of ethylene oxide and α-methyl D-glucoside
The diadduct of 15 mols of ethylene oxide and α-methyl D-glucoside
The diadduct of 5 mols of propylene oxide and α-methyl D-glucoside
The diadduct of 8 mols of propylene oxide and α-butyl D-glucoside
The diadduct of 15 mols of propylene oxide and α-methyl D-glucoside
The triadduct of 5 mols of ethylene oxide and α-ethyl D-glucoside
The triadduct of 10 mols of ethylene oxide and α-methyl D-glucoside
The triadduct of 5 mols of propylene oxide and α-methyl D-glucoside
The triadduct of 10 mols of propylene oxide and α-methyl D-glucoside In combination with the above tetrahydropyrans are metal organic salts. Suitable metal organic salts which can be used in combination with the tetrahydropyrans and which form one component of our stabilizing compositions are the following as well as their mixtures.

Zinc acetate
Zinc propionate
Zinc 2-ethylhexoate
Zinc ricinoleate
Zinc naphthenate
Zinc tallate
Calcium acetate
Calcium proprionate
Cadmium 2-ethylhexoate
Cadmium naphthenate
Cadmium ricinoleate
Cadmium tallate
Barium 2-ethylhexoate
Barium naphthenate
Barium ricinoleate
Barium tallate These metal organic salts as well as their mixtures are well known compositions of matter. The cationic portion can be one or a mixture of metals such as calcium, barium, strontium, magnesium, zinc, cadmium, mercury, tin and lead. The anionic portion of the metal organic salt can be derived from one or a mixture of fatty acids including commercially available fatty acids which in many instances are mixtures of the fatty acids listed below together with small amounts of other acids. Exemplary of these fatty acids are:

*Aliphatic acids*

Saturated:
    Acetic acid               Stearic acid
    Propionic acid        Palmitic acid
    2-ethylhexoic acid   Lauric acid
    Capric acid
Unsaturated:
    Linoleic acid         Oleic acid
    Linolenic acid       Ricinoleic acid
Cycloaliphatic acids:
    Naphthenic acids
Complex acids:
    Castor fatty acids   Rosin oil
    Tall oil fatty acids  Rosin The preparations of the metal organic salts are well known and our invention is in no manner limited by the preparation of this component.

While varying amounts of our new stabilizing compositions can be incorporated in the vinyl halide resin in order to prevent or reduce degradation, we have found that amounts of from about 0.5% to about 20% by weight of said composition based upon the weight of the resin are particularly effective. It should be recognized, however, that although effective stabilization is achieved when using the higher quantities of our stabilizing composition, the improvement or efficiency in stabilizing activity is not necessarily proportional to the quantity of stabilizing composition and hence any slight improvement would not be commensurate with the increased cost. Preferably there is present from about 0.5% to about 10% of the stabilizing composition based upon the weight of the resin.

In the stabilizing composition, the weight ratio of the tetrahydropyran component to metal organic salt component can vary from about 1:5 to about 5:1.

It is well known in the art that some degree of improvement in the stabilization of vinyl halide resin compositions can be obtained by incorporation of minor amounts, based on the weight of the resin, of epoxy-containing materials. However, we have also found that our stabilizing composition when added to these prior art compositions bring about enhanced stabilization. Exemplary of many of these prior art epoxy-containing materials are those set forth in Patents Nos. 2,564,194, De Nie et al., August 14, 1951, and 2,671,064, Cowell et al., March 2, 1954, and include epoxy-containing materials such as epichlorohydrin, styrene oxide, epoxidized soyabean oil, the hexyl and octyl esters of epoxystearic acid, epoxy resins derived from the reaction between epichlorohydrin and 2,2-bis(4-hydroxyphenyl) propane such as the commercially available resins designated as Epon 828, Epon 864 and Epon 1001. When used, these epoxy materials are generally present in amounts up to about 10% by weight of the resin. When our stabilizing compositions are used in formulations which also contain these epoxy materials, the proportions heretofore set forth also apply.

Exemplary of the vinyl halide resins which can be successfully stabilized by incorporation of our stabilizing compositions are the following: Homopolymers of vinyl chloride, vinyl bromide and vinylidene chloride; copolymers of vinyl and vinylidene halides such as vinyl chloride, vinyl bromide and vinylidene chloride which contain in an amount up to about 20% by weight of the copolymer of at least one ethylenically unsaturated monomer copolymerizable therewith such as vinyl acetate, styrene, diethyl maleate, maleic anhydride, acrylic acid esters, etc., and copolymers of vinyl chloride and vinylidene chloride in which the vinylidene chloride is present in amounts up to about 20% by weight of the total.

Various conventional materials which can be incorporated into the vinyl halide compositions are fillers such as York whiting (calcium carbonate) silica, talc, clay and diatomaceous earth; pigments such as chrome oxide green, titanium dioxide and phthalocyanine lube; plasticizers such as tricresyl phosphate, dibutyl phthalate, dioctyl phthalate, epoxidized soyabean oil, etc.; lubricants including metal soaps such as calcium stearate and barium stearate, waxes such as paraffin wax, carnauba wax and montan wax and refined oils and related materials such as mineral oil, stearic acid and lauric acid. If asbestos is to be used as a filler, then it must be iron-free asbestos, i.e., asbestos which has its iron content removed. The use of these ancillary materials is well known to those skilled in the art and hence the above enumerated ingredients are not to be taken in a limiting sense.

The preparation of the resin compositions is well known in the art. The ingredients, i.e., resin, stabilizer composition and other ancillary ingredients when used are mixed together and then calendered, milled, pressed or extruded at temperatures of from about 175° F. to about 350° F. in order to prepare films, sheets and other filled and unfilled structures of the resin. The compositions described in the following examples were prepared and tested for stabilization in accordance with the following procedure.

(1) The ingredients were blended together in a Hobart type mixer.

(2) The resulting blend, referred to as stock, was then dropped on to a roll mill heated at a temperature of 300° F.

(3) After the stock had been fluxed, banded and blended for five minutes on the mill, it was removed as a 20 mil sheet.

(4) Samples of the 20 mil sheet were then placed in a circulating air oven for various periods of time at a temperature between 320° F. and 350° F.

Since color change is the principal change indicative of the extent of degradation in vinyl resin systems, such is utilized as an indication of stabilization efficiency. In this manner, color changes of stabilized samples are compared either visually or optically with a blank or other standard. In the examples herein, color change was determined by measuring the diffuse reflectance of the surfaces of the various vinyl resin samples with a Photovolt Photoelectric Reflection Meter, Model 610 (manufactured and sold by the Photovolt Corporation, New York, N.Y.), using a blue filter and using the white standard which is supplied with the instrument as 68% reflectance. A determination of the diffuse reflectance of the surface of a material gives an accurate determination of the lightness or darkness of the surface. A dark or discolored surface resulting from degradation will tend to absorb light and hence have a low diffuse reflectance. A light colored surface will reflect light and hence have a high diffuse reflectance. Thus, all other variables being equal or relatively so, e.g., the texture of the respective surfaces of the materials to be compared, a material having a lighter colored surface will have a higher diffuse reflectance and hence less degradation than a material having a darker or discolored surface. In the following examples, the reflectance determinations were made upon the samples after removal from the oven.

The anhydroenneaheptitol (AEH) used herein was introduced in the form of a 70% active aqueous solution. Hence, the actual amount of AEH used in each example is determined by multiplying by 0.7 the parts by weight of AEH recited in each example. The α-methyl D-glucoside was a 100% active solid. The stearic acid used to prepare the zinc and cadmium stearates of the examples was a commercial stearic acid containing 55% by weight of palmitic acid and 45% by weight of stearic acid. The behenic acid used to prepare the barium cadmium behenate of the examples was a commercial behenic acid containing

| | by wt. |
|---|---|
| Arachidic acid | 38.3 |
| Behenic acid | 29.2 |
| Stearic acid | 17.2 |
| Palmitic acid | 13.5 |
| Myristic acid | 1.8 |

In the examples, all parts are parts by weight.

EXAMPLE I

This example demonstrates the broad range of effectiveness of our stabilizer compositions. That is, the stabilizing composition was present in an amount of from 1.0% to 15% by weight of the resin. The weight ratio of the tetrahydropyran to the metal organic salt was maintained at 1:1. The synergistic effect which is achieved by our stabilizing compositions is also clearly shown. That is, the stabilization which is achieved by our stabilizing compositions is greater than that stabilization which is achieved by using an equal amount of either stabilizer component alone. Note also that this synergism is present even when epoxy containing materials are present in the formulation.

| Ingredients | Parts By Weight | | | | | | | | |
|---|---|---|---|---|---|---|---|---|---|
| VYNW-5 [1] | 100 | 100 | 100 | 100 | 100 | 100 | 100 | 100 | 100 |
| Dioctyl phthalate | 45 | 45 | 45 | 45 | 45 | 45 | 45 | 45 | 45 |
| Epoxidized soyabean oil | 5 | 5 | 5 | 5 | 5 | 5 | 5 | 5 | 5 |
| Stearic acid | 0.25 | 0.25 | 0.25 | 0.25 | 0.25 | 0.25 | 0.25 | 0.25 | 0.25 |
| Cadmium 2-ethylhexoate | 15.0 | 0 | 7.5 | 10 | 0 | 5 | 1 | 0 | 0.5 |
| Anhydroenneaheptitol | 0 | 21.4 | 10.7 | 0 | 14.3 | 7.2 | 0 | 1.43 | 0.72 |
| Reflectometer reading [2] | 4 | 10 | 41 | 3 | 22 | 46 | 15 | 6 | 28 |

[1] A copolymer containing 97% by weight of vinyl chloride and 3% by weight of vinyl acetate.
[2] Taken after 90 min. at 350° F. in the oven for the 15% conce; taken after 60 min. at 350° F. in the oven for 10% and 1% conce.

EXAMPLE II

In this example, the ratios of the tetrahydropyran and the metal organic salt were varied from 2:1 to 1:2. The total amount of stabilizer composition was held at 2% by weight of the resin.

| Ingredients | Parts By Weight | | | | |
|---|---|---|---|---|---|
| VYNW-5 | 100 | 100 | 100 | 100 | 100 |
| Dioctyl phthalate | 45 | 45 | 45 | 45 | 45 |
| Epoxidized soyabean oil | 5 | 5 | 5 | 5 | 5 |
| Stearic acid | 0.25 | 0.25 | 0.25 | 0.25 | 0.25 |
| Cadmium 2-ethylhexoate | 0.67 | 1.0 | 1.33 | 2 | 0 |
| Anhydroenneaheptitol | 1.9 | 1.43 | 0.96 | 0 | 2.85 |
| Reflectometer readings [1] | 39 | 40 | 39 | 11 | 1.5 |

[1] Taken after 60 min. at 350° F. in the oven.

EXAMPLE III

Whereas the preceding examples were directed to unfilled resin stock, this example is directed to filled resin stock as indicated by the presence of York whiting (calcium carbonate) and the pigment, titanium dioxide. In the example, the total amount of stabilizer composition was 3% by weight of the resin while the weight ratio of the tetrayhdropyran to metal organic salt varied from 2:1 to 1:2.

| Ingredients | Parts By Weight | | | | |
|---|---|---|---|---|---|
| VYHH [1] | 100 | 100 | 100 | 100 | 100 |
| Dioctyl phthalate | 40 | 40 | 40 | 40 | 40 |
| Titanium dioxide | 10 | 10 | 10 | 10 | 10 |
| York Whiting | 125 | 125 | 125 | 125 | 125 |
| Zinc stearate | 3.0 | 0 | 1.5 | 1.0 | 2.0 |
| Anhydroenneaheptitol | 0 | 4.3 | 2.14 | 2.85 | 1.43 |
| Reflectometer readings [2] | 11 | 38 | 72 | 70.5 | 69 |

[1] A copolymer containing 83% by wt. of vinyl chloride and 17% by wt. of vinyl acetate.
[2] Taken after 30 minutes at 320° F. in the oven.

EXAMPLE IV

In this example, α-methyl D-glucoside was used as the tetrahydropyran. The synergism resulting from the combination of tetrahydropyran component and the metal organic salt component is clearly shown, i.e., the stabilization achieved by the stabilizer combination is greater than that achieved by use of an equal amount of only one component. Keeping the total amount of stabilizer composition at 3% by weight of the resin, the ratio of the tetrahydropyran to the metal organic salt was varied from 2:1 to 1:2.

| Ingredients | Parts By Weight | | | | |
|---|---|---|---|---|---|
| VYNW-5 | 100 | 100 | 100 | 100 | 100 |
| Dioctyl phthalate | 45 | 45 | 45 | 45 | 45 |
| Epoxidized soyabean oil | 5 | 5 | 5 | 5 | 5 |
| Stearic acid | 0.25 | 0.25 | 0.25 | 0.25 | 0.25 |
| Cadmium 2-ethylhexoate | 3.0 | 0 | 1 | 1.5 | 2.0 |
| α-Methyl D-glucoside | 0 | 3.0 | 2 | 1.5 | 1.0 |
| Reflectometer reading [1] | <0 | 8 | 32 | 32 | 28 |

[1] Taken after 60 minutes at 350° F. in the oven.

EXAMPLE V

Using 4% of stabilizing composition by weight of the resin, the ratio of the tetrahydropyran to metal organic salt was varied from 5:1 to 1:5.

| Ingredients | Parts By Weight | | | | |
|---|---|---|---|---|---|
| Geon 101 [1] | 100 | 100 | 100 | 100 | 100 |
| Dioctyl phthalate | 50 | 50 | 50 | 50 | 50 |
| Stearic acid | 0.25 | 0.25 | 0.25 | 0.25 | 0.25 |
| Cadmium stearate | 0.67 | 2.0 | 3.33 | 4.0 | 0 |
| Anhydroenneaheptitol | 4.75 | 2.85 | 0.96 | 0 | 5.7 |
| Reflectometer reading [2] | 6 | 48 | 50 | 1.5 | 3 |

[1] Polyvinyl chloride.
[2] Taken after 45 min. at 350° F. in the oven.

EXAMPLE VI

In this example different metal organic salts and different vinyl halide resins were used with the tetrahydropyran. In each instance, the unexpected synergism accruing from our stabilizer combination is clearly evident.

| A. Ingredients | Parts By Weight | | |
|---|---|---|---|
| Geon 101 | 100 | 100 | 100 |
| Dioctyl phthalate | 45 | 45 | 45 |
| Epoxidized soyabean oil | 5 | 5 | 5 |
| Stearic acid | 0.5 | 0.5 | 0.5 |
| Barium-cadmium behenate [1] | 0 | 8 | 4.0 |
| Anhydroenneaheptitol | 11.4 | 0 | 5.7 |
| Reflectometer readings [2] | 16.5 | 27.5 | 40 |

[1] 37.5% by weight of barium behenate and 62.5% by wt. of cadmium behenate.
[2] Taken after 45 minutes at 350° F. in the oven.

| B. Ingredients | Parts By Weight | | |
|---|---|---|---|
| Geon 103 [1] | 100 | 100 | 100 |
| Dioctyl phthalate | 40 | 40 | 40 |
| Epoxidized soyabean oil | 5 | 5 | 5 |
| Stearic acid | 0.25 | 0.25 | 0.25 |
| Barium stearate | 2.0 | 0 | 1.0 |
| α-Methyl D-glucoside | 0 | 2.0 | 1.0 |
| Reflectometer readings [2] | 34 | 32 | 45 |

[1] This is a polyvinyl chloride homopolymer.
[2] Taken after 90 minutes at 300° F. in the oven.

Having described our invention, what we claim as new and desire to secure by Letters Patent is:

1. A composition of matter comprising
   (1) at least one tetrahydropyran selected from the group consisting of
      (a) 3,3,5,5 - tetrakis (hydroxymethyl)-tetrahydropyranol-4,
      (b) 2 - hydroxymethyl - 3,4,5 - trihydroxy - 6-alkoxy tetrahydropyrans wherein said alkoxy substituent contains from one to four carbon atoms,
      (c) esters of said (a) and (b) which are the reaction products of said (a) and (b) with an organic acid selected from the group consisting of aliphatic saturated and unsaturated acids having from 2 to 22 carbon atoms and
      (d) ethers of said (a) and (b) which are the reaction products of said (a) and (b) with from one to about 15 mols of an alkylene oxide selected from the group consisting of ethylene oxide, propylene oxide and butylene oxide with the proviso that said ester (c) and said ether (d) have present at least two hydroxyl groups, and
   (2) at least one metal organic salt, the cationic portion thereof being selected from the group consisting of the calcium, barium, strontium, magnesium, zinc, cadmium, mercury, tin and lead and the anionic portion thereof being selected from the group consisting of saturated and unsaturated fatty acids having from two to eighteen carbon atoms, naphthenic acids, rosin oil, rosin and mixtures thereof,
   said tetrahydropyran and metal organic salt being present in a weight ratio of from about 5:1 to 1:5.

2. The composition of claim 1 in which said tetrahydropyran is 2 - hydroxymethyl - 3,4,5 - trihydroxy - 6-methoxy tetrahydropyran.

3. The composition of claim 1 in which said tetrahydropyran is 3,3,5,5-tetrakis (hydroxymethyl)-tetrahydropyranol-4.

4. The composition of claim 1 in which said tetrahydropyran is 3,3,5,5-tetrakis (hydroxymethyl)-tetrahydropyranol-4, and said metal organic salt is zinc stearate.

5. The composition of claim 1 in which said tetrahydropyran is 3,3,5,5-tetrakis (hydroxymethyl)-tetrahydropyranol-4, and said metal organic salt is cadmium 2-ethyl hexoate.

6. The composition of claim 1 in which said tetrahydropyran is 2 - hydroxymethyl - 3,4,5 - trihydroxy - 6- methoxy tetrahydropyran, and said metal organic salt is barium-cadmium behenate.

7. A composition of matter comprising
(I) an iron-free polyvinyl halide resin selected from the group consisting of
  (1) homopolymers of vinyl chloride,
  (2) homopolymers of vinyl bromide,
  (3) homopolymers of vinylidene chloride,
  (4) copolymers of vinyl chloride containing in an amount up to about 20% by weight of said copolymer of at least one ethylenically unsaturated monomer copolymerizable therewith selected from the group consisting of vinyl acetate, styrene, diethyl maleate, maleic anhydride, esters of acrylic acid and vinylidene chloride,
  (5) copolymers of vinyl bromide containing in an an amount up to about 20% by weight of said copolymer of at least one ethylenically unsaturated monomer copolymerizable therewith selected from the group consisting of vinyl acetate, styrene, diethyl maleate, maleic anhydride, esters of acrylic acid and vinylidene chloride, and
  (6) copolymers of vinylidene chloride containing in an amount up to about 20% by weight of said copolymer of at least one ethylenically unsaturated monomer copolymerizable therewith selected from the group consisting of vinyl acetate, styrene, diethyl maleate, maleic anhydride, esters of acrylic acid and vinyl chloride and
(II) as a stabilizer therefor, present in stabilizing amounts, a mixture including
  (1) at least one tetrahydropyran selected from the group consisting of
    (a) 3,3,5,5-tetrakis (hydroxymethyl)-tetrahydropyranol-4,
    (b) 2 - hydroxymethyl - 3,4,5 - trihydroxy-6-alkoxy tetrahydropyrans wherein said alkoxy substituent contains from one to four carbon atoms,
    (c) esters of said (a) and (b) which are the reaction products of said (a) and (b) with an organic acid selected from the group consisting of aliphatic saturated and unsaturated acids having from 2 to 22 carbon atoms and
    (d) ethers of said (a) and (b) which are the reaction products of said (a) and (b) with from one to about 15 mols of an alkylene oxide selected from the group consisting of ethylene oxide, propylene oxide and butylene oxide with the proviso that said ester (c) and said ether (d) have present at least two hydroxyl groups, and
  (2) at least on metal organic salt, the cationic portion thereof being selected from the group consisting of the calcium, barium, strontium, magnesium, zinc, cadmium, mercury, tin and lead and anionic portion thereof being selected from the group consisting of saturated and unsaturated fatty acids having from two to eighteen carbon atoms, naphthenic acids, rosin oil, rosin and mixtures therof,
said tetrahydropyran and metal organic salt being present in a weight ratio of from about 5:1 to 1:5.

8. The composition of claim 7 in which said stabilizer is present in an amount of from about 0.5% to about 20% by weight of said resin.

9. The composition of claim 8 in which said tetrahydropyran is 3,3,5,5-tetrakis (hydroxymethyl)-tetrahydropyranol-4.

10. The composition of claim 8 in which said tetrahydropyran is 2 - hydroxymethyl - 3,4,5 - trihydroxy-6-methoxy tetrahydropyran.

11. The composition of claim 8 in which said resin is polyvinyl chloride.

12. The composition of claim 8 in which said resin is a copolymer containing about 97% by weight of vinyl chloride and about 3% by weight of vinyl acetate.

13. The composition of claim 8 in which said resin is a copolymer containing about 83% by weight of vinyl chloride and about 17% by weight of vinyl acetate.

14. The composition of claim 8 in which said tetrahydropyran is 2 - hydroxymethyl - 3,4,5 - trihydhoxy - 6-methoxy tetrahydropyran, and said metal organic salt is zinc stearate.

15. The composition of claim 8 in which said tetrahydropyran is 2 - hydroxymethyl - 3,4,5 - trihydroxy - 6-methoxy tetrahydropyran, and said metal organic salt is barium stearate.

References Cited by the Examiner
UNITED STATES PATENTS

| | | | |
|---|---|---|---|
| 2,671,064 | 3/1954 | Cowell et al. | 260—45.8 |
| 2,684,353 | 7/1954 | Greensphan et al. | 260—45.8 |
| 2,837,490 | 6/1958 | Hecker | 260—23 |
| 2,962,508 | 11/1960 | Prosser | 260—345.9 |
| 3,074,966 | 1/1963 | Barnes | 260—345.9 |

FOREIGN PATENTS 565,528  11/1958  Canada.

OTHER REFERENCES

Chevassus et al., "La Stabilization des Chlorures de Polyvinyle," Amphora, Paris, 1957.

LEON J. BERCOVITZ, *Primary Examiner.*

A. D. SULLIVAN, M. STERMAN, J. R. LIBERMAN, W. H. SHORT, *Examiners.*